(12) United States Patent
Du

(10) Patent No.: US 11,621,651 B2
(45) Date of Patent: Apr. 4, 2023

(54) HIGH-POWER DENSITY, SINGLE-PHASE CASCADED H-BRIDGE RECTIFIER, CONTROL METHOD, AND CONTROL SYSTEM

(71) Applicant: SHANDONG UNIVERSITY, Shandong (CN)

(72) Inventor: Chunshui Du, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 102 days.

(21) Appl. No.: 17/271,370

(22) PCT Filed: Jun. 19, 2020

(86) PCT No.: PCT/CN2020/097207
§ 371 (c)(1),
(2) Date: Feb. 25, 2021

(87) PCT Pub. No.: WO2020/253846
PCT Pub. Date: Dec. 24, 2020

(65) Prior Publication Data
US 2021/0203248 A1    Jul. 1, 2021

(30) Foreign Application Priority Data
Jun. 21, 2019   (CN) .......................... 201910543787.9

(51) Int. Cl.
*H02M 7/219* (2006.01)
*H02M 7/487* (2007.01)
*H02M 1/00* (2006.01)

(52) U.S. Cl.
CPC ........... *H02M 7/487* (2013.01); *H02M 7/219* (2013.01); *H02M 1/007* (2021.05); *H02M 1/009* (2021.05)

(58) Field of Classification Search
CPC ............ H02M 7/02; H02M 7/04; H02M 7/05; H02M 7/062; H02M 7/125; H02M 7/155;
(Continued)

(56) References Cited

U.S. PATENT DOCUMENTS

| 2010/0027304 A1* | 2/2010 | Wang ...................... H02M 1/15 |
| | | 363/126 |
| 2016/0149509 A1 | 5/2016 | Hergt et al. |
| 2017/0222545 A1* | 8/2017 | Haga ...................... H02M 7/25 |

FOREIGN PATENT DOCUMENTS

| CN | 103066871 A | 4/2013 |
| CN | 204190640 U | 3/2015 |

(Continued)

OTHER PUBLICATIONS

R. Wang et al., "A High Power Density Single Phase PWM Rectifier with Active Ripple Energy Storage", IEEE, 2010, pp. 1378-1383. (Year: 2010).*

(Continued)

*Primary Examiner* — Thienvu V Tran
*Assistant Examiner* — Carlos O Rivera-Perez
(74) *Attorney, Agent, or Firm* — Oliff PLC

(57) ABSTRACT

The present disclosure provides a high-power density, single-phase cascaded H-bridge rectifier, a control method, and a control system. The high-power density, single-phase cascaded H-bridge rectifier includes: an alternating current (AC) grid-side filter inductor and at least two cascaded power conversion units, where each power conversion unit includes an H-bridge power unit, a decoupling unit, and a direct current (DC)-side equivalent load that are connected in parallel; and each decoupling unit is an independent (Continued)

buck-type active power decoupling circuit, and the decoupling unit is configured to buffer secondary ripple power, to reduce a capacity of a DC bus capacitor.

9 Claims, 8 Drawing Sheets

(58) Field of Classification Search
CPC .. H02M 7/1555; H02M 7/1557; H02M 7/162; H02M 7/1623; H02M 7/1626; H02M 7/217; H02M 7/219; H02M 7/42; H02M 7/44; H02M 7/483; H02M 7/4833; H02M 7/4835; H02M 7/487; H02M 7/49; H02M 7/521; H02M 7/527; H02M 7/529; H02M 7/5387; H02M 1/0003; H02M 1/0016; H02M 1/0019; H02M 1/0025; H02M 1/0043; H02M 1/0067; H02M 1/007; H02M 1/0074; H02M 1/0085; H02M 1/009; H02M 1/0095; H02M 1/12; H02M 1/123; H02M 1/126; H02M 1/14; H02M 1/143; H02M 1/146; H02M 1/15; H02M 1/34–348; H02M 1/42; H02M 1/4225; H02M 1/4233; H02M 1/4241; H02M 3/158
USPC .... 363/34, 35, 39–48, 50, 56.12, 65, 67–72, 363/74, 95–99, 125–134; 323/205–211, 323/271–275, 280, 282–286, 351; 327/551–559
See application file for complete search history.

(56) References Cited

FOREIGN PATENT DOCUMENTS

| CN | 105811790 A | 7/2016 |
|----|-------------|--------|
| CN | 107546999 A | 1/2018 |
| CN | 107888091 A | 4/2018 |
| CN | 109194113 A | 1/2019 |
| CN | 109450239 A | 3/2019 |
| CN | 110380626 A | 10/2019 |

OTHER PUBLICATIONS

Sep. 21, 2020 International Search Report issued in International Patent Application No. PCT/CN2020/097207.
Sep. 21, 2020 Written Opinion issued in International Patent Application No. PCT/CN2020/097207.
Mar. 17, 2020 Office Action issued in Chinese Patent Application No. 201910543787.9.
Shiyong Hu et al. "Research on Capacitor Voltage Balance Control Strategy of Cascaded H-Bridge Rectifier". Electric Engineering, No. 18, Sep. 30, 2018, pp. 147-159.
Michail Vasiladiotis et al. "Model Predictive-Based Control Method for Cascaded H-Bridge Multilevel Active Rectifiers". IEEE, 2011, pp. 3200-3207.
Hongbo Li et al. "Active Power Decoupling for High-Power Single-Phase PWM Rectifiers". IEEE Transactions on Power Electronics, vol. 28, No. 3, Mar. 2013, pp. 1308-1319.

* cited by examiner

HIGH-POWER DENSITY, SINGLE-PHASE CASCADED H-BRIDGE RECTIFIER, CONTROL METHOD, AND CONTROL SYSTEM

BACKGROUND

Technical Field

The present disclosure belongs to the field of cascaded multilevel converters, and in particular, to a high-power density, single-phase cascaded H-bridge rectifier, a control method, and a control system.

Related Art

The description in this section merely provides background information related to the present disclosure and does not necessarily constitute the prior art.

A power converter of a cascaded multilevel power electronic transformer (PET) has double-frequency power pulsation on a direct current (DC) side. To reduce DC bus voltage ripples, a manner of adding a filter capacitor or a passive LC secondary filter network may be adopted. However, the inventor finds that such a manner increases the weight and the volume of a system, and in particular, non-linear magnetic core characteristics of an LC filter network are distorted under the action of a harmonic current, and is likely to cause system instability.

The voltage ripples can be certainly reduced by adding a capacitor. However, the inventor finds that the volume and costs of a cascaded multilevel PET power converter are increased, which is not beneficial to improving the power density of an onboard cascaded multilevel PET. If a contradiction between DC voltage pulsation of a system and costs and the volume of the system cannot be reconciled, a voltage allowance of a power switch module has to be increased, and consequently, system reliability and a power conversion capacity are inevitably reduced.

SUMMARY

To resolve the foregoing problems, in a first aspect of the present disclosure, a high-power density, single-phase cascaded H-bridge rectifier is provided, to use an independent buck-type active power decoupling circuit for a cascaded multilevel converter power unit, to provide a path for secondary power pulsation. Compared with purely adding a capacitor, under the same conversion power and the same DC voltage ripple, a quantity of filter capacitors may theoretically be reduced by 10 times, so that the volume and the weight of a system can be effectively reduced, and the power density and the reliability of the system can be increased.

To achieve the above objectives, the following technical solutions are adopted in the present disclosure.

A high-power density, single-phase cascaded H-bridge rectifier is provided, including:

an alternating current (AC) grid-side filter inductor and at least two cascaded power conversion units, where each power conversion unit includes an H-bridge power unit, a decoupling unit, and a DC-side equivalent load that are connected in parallel; and each decoupling unit is an independent buck-type active power decoupling circuit, and the decoupling unit is configured to buffer secondary ripple power, to reduce a capacity of a DC bus capacitor.

In an implementation, the decoupling unit includes a series-connected power module, the series-connected power module is formed by two switch power elements connected in series, two ends of the series-connected power module are respectively connected to a positive bus and a negative bus on a DC side of the corresponding power conversion unit, an intermediate connection point of the series-connected power module is connected to a circuit in which an inductor and a capacitor are connected in series, and the other end of the capacitor is connected to the negative bus on the DC side of the corresponding power conversion unit.

In an implementation, the each power conversion unit further includes: a DC filter capacitor connected to the DC-side equivalent load in parallel, where the DC filter capacitor is configured to eliminate a high-order harmonic wave.

In an implementation, the DC-side equivalent load is a resistor element, a DC/DC converter, or a capacitor element.

To resolve the foregoing problems, in a second aspect of the present disclosure, a control method for a high-power density, single-phase cascaded H-bridge rectifier is provided. In the control method, a comprehensive control policy for DC-side voltage equalization and active power decoupling is used to implement both DC-side output voltage equalization between cascaded units and suppression of secondary ripple voltage pulsation.

To achieve the above objectives, the following technical solutions are adopted in the present disclosure.

A control method for a high-power density, single-phase cascaded H-bridge rectifier is provided, including:

controlling a DC bus voltage of each power conversion unit in a closed-loop manner, to generate an operation voltage of each power conversion unit and a total voltage of the H-bridge rectifier;

using the total voltage of the H-bridge rectifier as an outer-loop given value, and controlling a grid-side current in a closed-loop manner, to generate an average modulation signal factor;

comparing an average value of the total voltage of the system with each power unit voltage, and then multiplying a per-unit difference value by a grid-side voltage phase to obtain a result as a deviation modulation signal factor, to implement both voltage equalization and suppression of secondary pulsation of the DC bus voltage;

superimposing the deviation modulation signal factor of the each power conversion unit with the average modulation signal factor, to generate a final modulation signal of the each power conversion unit;

comparing the final modulation signal of the each power conversion unit with a carrier, and generating a drive signal of a switch tube of the each power conversion unit by using a single-pole double-frequency phase-shifted carrier modulation algorithm; and extracting a secondary ripple current on the DC bus of the each power conversion unit in real time, and calculating a duty cycle of a power switch tube in the decoupling unit online, to transfer secondary ripple power on the DC bus to the decoupling unit.

In an implementation, a process of generating the operation voltage of the each power conversion unit and the total voltage of the H-bridge rectifier is:

to achieve stability and balance of a DC-side bus voltage of each cascaded unit, comparing a filtered actual output voltage on the DC side of the each cascaded unit with a voltage reference value, performing PI regulation on each difference value, to obtain a corresponding operation control voltage amplitude, and during system operation, adding up operation control voltages of all units in real time to obtain the total voltage of the H-bridge rectifier.

In an implementation, a process of generating the average modulation signal factor is:

dividing the total voltage of the H-bridge rectifier by a grid-side per-unit input voltage amplitude, and then multiplying a result by an output phase of a grid-side voltage phase-locked loop (PLL), to obtain a grid-side current reference voltage; and comparing an actually detected instantaneous grid current value with the grid-side current reference value, and performing static error free tracking of a current by using the grid-side filter inductor, to output the average modulation signal factor.

To resolve the foregoing problems, in a third aspect of the present disclosure, a control system of a high-power density, single-phase cascaded H-bridge rectifier is provided. In the control system, a comprehensive control policy for DC-side voltage equalization and active power decoupling is used, to implement both DC-side output voltage equalization between cascaded units and suppression of secondary ripple voltage pulsation.

To achieve the above objectives, the following technical solutions are adopted in the present disclosure.

A control system of a high-power density, single-phase cascaded H-bridge rectifier is provided, including:

a DC bus voltage control module, configured to control a DC bus voltage of each power conversion unit in a closed-loop manner, to generate an operation voltage of the each power conversion unit and a total voltage of the H-bridge rectifier;

a unit-power-factor rectification module, configured to use the total voltage of the H-bridge rectifier as an outer-loop given value, and control a grid-side current in a closed-loop manner, to generate an average modulation signal factor;

a voltage equalization module, configured to respectively compare an average value of the total voltage of the system with each power unit voltage, and then multiply a per-unit difference value by a grid-side voltage phase to obtain a result as a deviation modulation signal factor, to implement both voltage equalization and suppression of secondary pulsation of the DC bus voltage;

a modulation-signal generation module, configured to superimpose the deviation modulation signal factor of the each power conversion unit with the average modulation signal factor, to generate a final modulation signal of the each power conversion unit;

a drive-signal generation module, configured to compare the final modulation signal of the each power conversion unit with a carrier, and generate a drive signal of a switch tube of the each power conversion unit by using a single-pole double-frequency phase-shifted carrier modulation algorithm; and an active-power-decoupling control module, configured to extract a secondary ripple current on the DC bus of each power conversion unit in real time, and calculate a duty cycle of a power switch tube in the decoupling unit online, to transfer secondary ripple power on the DC bus to the decoupling unit.

In an implementation, in the DC bus voltage control module, a process of generating the operation voltage of the each power conversion unit and the total voltage of the H-bridge rectifier is:

to achieve stability and balance of a DC-side bus voltage of each cascaded unit, comparing a filtered actual output voltage on the DC side of the each cascaded unit with a voltage reference value, performing PI regulation on each difference value, to obtain a corresponding operation control voltage amplitude, and during system operation, adding up operation control voltages of all units in real time to obtain the total voltage of the H-bridge rectifier.

In an implementation, in the unit-power-factor rectification module, a process of generating the average modulation signal factor is:

dividing the total voltage of the H-bridge rectifier by a grid-side per-unit input voltage amplitude, and then multiplying a result by an output phase of a grid-side voltage PLL, to obtain a grid-side current reference voltage; and comparing an actually detected instantaneous grid current value with the grid-side current reference value, and performing static error free tracking of a current by using the grid-side filter inductor, to output the average modulation signal factor.

Beneficial effects of the present disclosure are as follows:

(1) In terms of topology, a buck-type active power decoupling unit is added on a DC side of a single-phase cascaded H-bridge multilevel converter, which is beneficial to reducing a capacitor voltage.

(2) In terms of control, a comprehensive control policy for DC-side voltage equalization and active power decoupling is used, to implement both DC-side output voltage equalization between cascaded units and suppression of secondary ripple voltage pulsation; and an adaptive frequency selector is used, to extract a secondary ripple current in a DC bus in real time, and participate in calculation of a duty cycle of a bridge arm switch tube of a decoupling unit. Therefore, the control is simple, and an effect of suppression of DC-side secondary ripple voltage pulsation is significant.

(3) A power switch tube in the decoupling unit works in a discontinuous current mode, and is particularly suitable for new-generation SiC or GaN devices. A power switch is switched on at zero current without a switch-on loss; and the switch-off speed is extremely fast, and a switch-off loss is approximately zero. Therefore, the discontinuous current mode can effectively increase a switching frequency of the decoupling unit, and reduce inductance and a loss of the inductance, thereby improving the power density.

BRIEF DESCRIPTION OF THE DRAWINGS

The accompanying drawings constituting a part of the present disclosure are used to provide further understanding of the present disclosure. Exemplary embodiments of the present disclosure and descriptions thereof are used to explain the present disclosure, and do not constitute an improper limitation to the present disclosure.

FIG. 5(*b*) is a waveform diagram of a DC-side output voltage and a decoupling capacitor voltage according to an embodiment of the present disclosure;

FIG. 7(*b*) is an enlarged waveform diagram of DC-side output voltages of two modules before and after a sudden load change according to an embodiment of the present disclosure;

FIG. 9(*b*) is an enlarged waveform diagram of a DC-side output voltage during starting in an unbalanced state according to an embodiment of the present disclosure.

DETAILED DESCRIPTION

The present disclosure is further described below with reference to the accompanying drawings and embodiments.

It should be noted that the following detailed descriptions are all exemplary and are intended to provide a further description of the present disclosure. Unless otherwise specified, all technical and scientific terms used herein have the same meaning as commonly understood by a person of ordinary skill in the art to which the present disclosure belongs.

It should be noted that terms used herein are only for describing specific implementations and are not intended to limit exemplary implementations according to the present disclosure. As used herein, the singular form is intended to include the plural form, unless the context clearly indicates otherwise. In addition, it should be further understood that terms "include" and/or "comprise" used in this specification indicate that there are features, steps, operations, devices, assemblies, and/or combinations thereof.

In this embodiment, a topology of the high-power density, single-phase cascaded H-bridge multilevel converter includes an AC power supply, an AC-side filter inductor, and N cascaded power converter submodules. N is a positive integer greater than or equal to 2.

Figure 1:
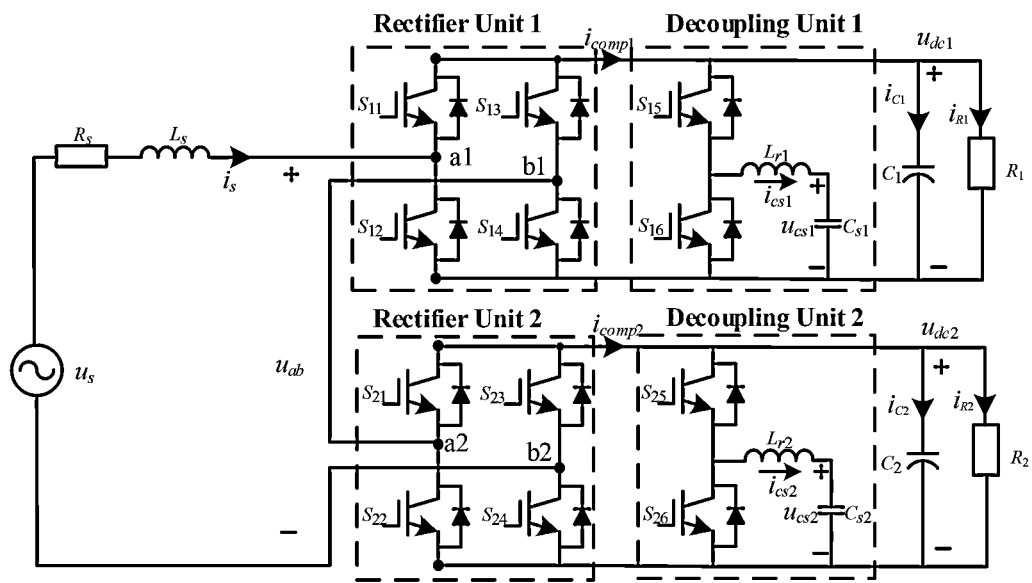
FIG. 1 is a topology diagram of a high-power density, single-phase cascaded H-bridge multilevel converter according to an embodiment of the present disclosure.

For the ease of analysis, an example in which two modules are cascaded is used, and a topology diagram thereof is shown in FIG. 1. The AC power supply is connected to input sides of two cascaded power converter submodules through the AC-side filter inductor. The power converter submodule includes a full-bridge circuit, a power decoupling circuit, a direct current (DC)-side support capacitor, and a DC-side equivalent load, where an output of the full-bridge circuit is connected to the DC side through a power decoupling circuit, and the power decoupling circuit is configured to suppress secondary ripple power on a DC bus and reduce a capacity of the DC-side support capacitor.

The full-bridge circuit is formed by power switch tubes $S_{i1}$-$S_{i4}$ (i=1, 2) combined with a reverse diode, where an emitter of $S_{i1}$ is connected to a collector of $S_{i2}$ to form a bridge arm $A_i$, an emitter of $S_{i3}$ is connected to a collector of $S_{i4}$ to form a bridge arm $B_i$, a midpoint between the two bridge arms is an input end of the full-bridge circuit, a common collector of $S_{i1}$ is connected to a common collector of $S_{i3}$, a common emitter of $S_{i2}$ is connected to a common emitter of $S_{i4}$, and a connection point between the common collectors and a connection point between the common emitter are used as an output end of the full-bridge circuit.

The power decoupling circuit adopts buck-type active power decoupling, and is formed by two power switch tubes $S_{i5}$ and $S_{i6}$ combined with a reverse diode, a decoupling inductor $L_{ri}$, and a decoupling capacitor $C_{s1}$. An emitter of $S_{i5}$ and a collector of $S_{i6}$ are connected to form a decoupling bridge arm, and the decoupling inductor and the decoupling capacitor are connected in series, to connect a midpoint of the decoupling bridge arm and a common ground.

The DC-side equivalent load includes a DC bus support capacitor $C_i$ and an equivalent load resistor $R_1$ that are connected in parallel.

$i_{comp1}$ and $i_{comp2}$ are respectively an output current of a rectifier unit 1 and an output current of a rectifier unit 2, and are used for extracting a secondary ripple current. $u_{cs1}$ and $u_{cs2}$ are respectively voltages of two ends of a decoupling capacitor $C_{s1}$ and a decoupling capacitor $C_{s2}$. $i_{Lr1}$ and $i_{Lr2}$ are currents flowing through a decoupling inductor $L_a$ and a decoupling inductor $L_{r2}$. $u_{dc1}$ and $u_{dc2}$ are DC-side output voltages.

Figure 2A:
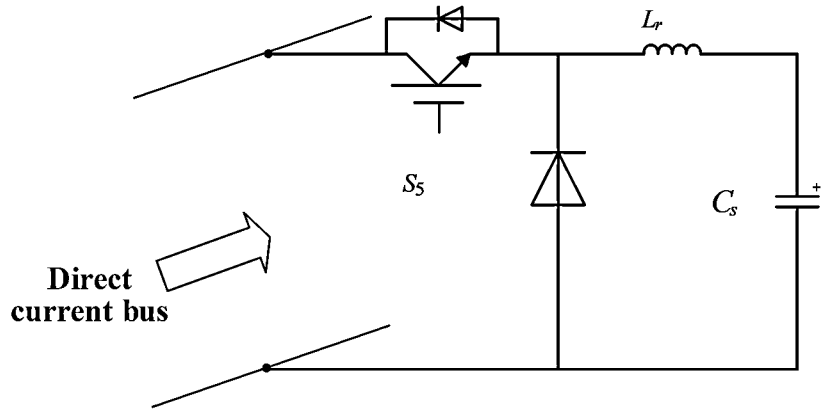
FIG. 2(a) shows a buck working stage of a buck-type active power decoupling topology according to an embodiment of the present disclosure.
Figure 2B:
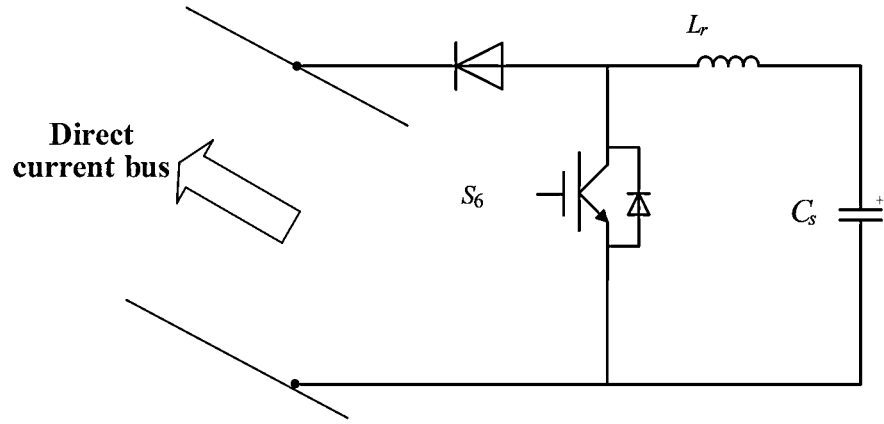
FIG. 2(b) shows a boost working stage of a buck-type active power decoupling topology according to an embodiment of the present disclosure.

Buck-type active power decoupling control and rectifier unit control are not coupled and can be performed independently. A solution of extracting a secondary ripple current in real time based on an adaptive frequency selector is adopted, and duty cycles of switch tubes of the decoupling bridge arm are distributed in real time through calculation. Such independent control does not increase complexity of system control although the active power decoupling control is added, and cooperation with voltage equalization control enables the system to have both high reliability and high power density. A principle of the power decoupling circuit compensating the secondary ripple power of the DC bus is as follows:

A decoupling circuit of the first power submodule is used as an example. A decoupling capacitor is used as an energy storage element to store all ripple energy, and a decoupling inductor is only responsible for transferring energy. A working mode of a buck-type active power decoupling topology is shown in FIG. 2(*a*) and FIG. 2(*b*). In a process of transferring the secondary ripple power of the DC bus, a decoupling unit switches between two working modes to implement bidirectional interaction with the ripple energy in the DC bus. As shown in FIG. 2(*a*), the decoupling unit works in a buck mode, $S_{16}$ is in an off state, and the ripple energy storage in the decoupling capacitor is implemented through on and off of $S_{15}$. When $S_{15}$ is on, the DC bus simultaneously charges the decoupling inductor and the decoupling capacitor. After $S_{15}$ is switched off, the decoupling inductor continues to charge the decoupling capacitor, and the secondary ripple energy of the DC bus is all stored to the decoupling capacitor through this process. As shown in FIG. 2(*b*), when the decoupling unit works in a boost mode, $S_{15}$ is in an off state. When $S_{16}$ is on, the decoupling capacitor charges the decoupling inductor. After $S_{16}$ is switched off, the decoupling capacitor and the decoupling inductor simultaneously release energy to the DC bus, and the ripple energy in the decoupling capacitor is fully compensated to the DC bus through this process.

Calculation of a duty cycle of a switch tube of the active-power-decoupling control module is as follows:

in the buck working stage, when $S_{15}$ is on, the decoupling inductor performs charging, and a current rising slope is:

$$\text{Buck\_up} = \frac{U_{dc} - U_{cs}}{L_r} \tag{1}$$

when $S_{15}$ is off, the decoupling inductor performs discharging, and a current falling slope is:

$$\text{Buck\_down} = \frac{U_{cs}}{L_r} \tag{2}$$

in the boost working stage, when $S_{16}$ is on, the decoupling inductor performs charging, and a current rising slope is:

$$\text{Boost\_up} = \frac{U_{cs}}{L_r} \tag{3}$$

when $S_{16}$ is off, the decoupling inductor performs discharging, and a current falling slope is:

$$\text{Boost\_down} = \frac{U_{dc} - U_{cs}}{L_r} \tag{4}$$

where $U_{dc}$ is a voltage of two ends of the DC bus of the decoupling circuit of the first power submodule;

$U_{cs}$ is a voltage of two ends of a decoupling capacitor $C_s$ of the decoupling circuit of the first power submodule; and $L_r$ is the decoupling inductor of the decoupling circuit of the first power submodule.

Figure 3A:
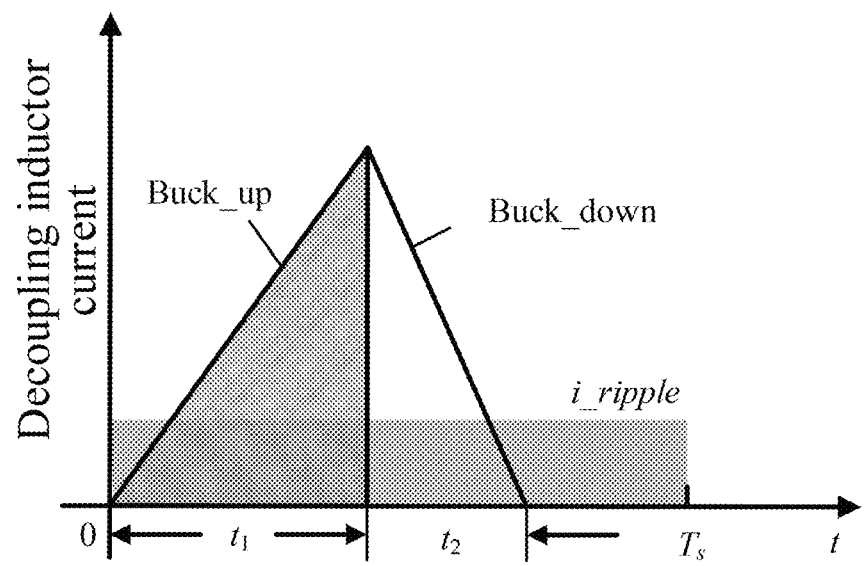
FIG. 3(a) is a schematic diagram of a decoupling inductor current during a charging stage of a decoupling capacitor according to an embodiment of the present disclosure.

In a switching cycle, a secondary ripple current $I_{ripple}$ on the DC bus may be considered as a constant value. As shown in FIG. 3 (a), in a switching cycle, a total secondary ripple current flowing through the switch tube $S_{15}$ may be represented by the area of a shaded portion:

$$i_{ripple} \cdot T_s = \frac{1}{2} t_1 \cdot t_1 \cdot \text{Buck\_up} \tag{5}$$

In the buck working stage, an on duty cycle of $S_{15}$ in each switching cycle may be represented as:

$$D_1 = \sqrt{\frac{2 i_{ripple} f_s}{\text{Buck\_up}}} \tag{6}$$

As shown in FIG. 3 (b), similarly, in the boost working stage, a total secondary ripple current flowing through the switch tube $S_{i5}$ in a switching cycle may be represented by the area of a shaded portion:

$$i_{ripple} \cdot T_s = \frac{1}{2} t_2 \cdot t_2 \cdot \text{Boost\_down} \tag{7}$$

where $T_s$ is the switching cycle.

Figure 3B:
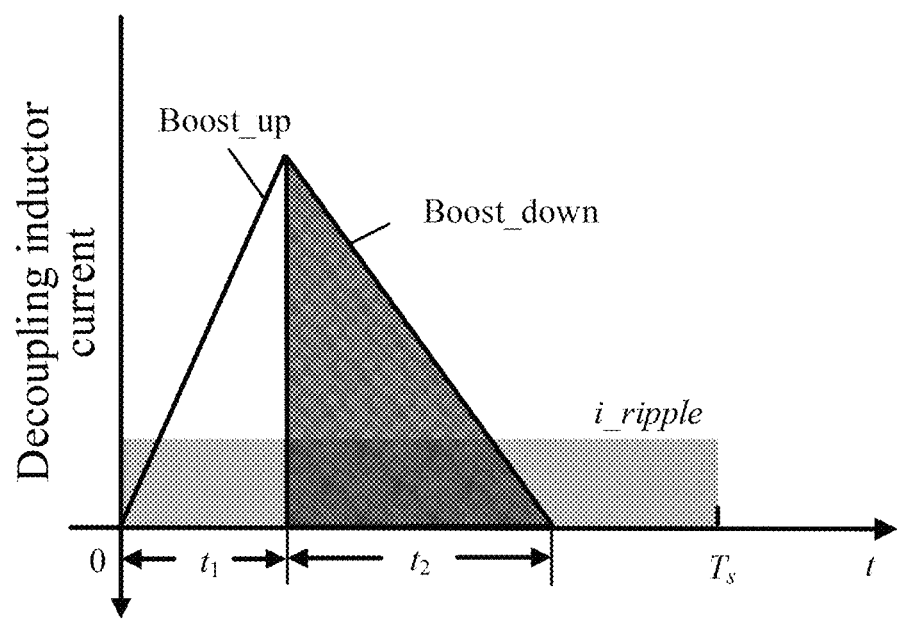
FIG. 3(b) is a schematic diagram of a decoupling inductor current during a discharging stage of a decoupling capacitor according to an embodiment of the present disclosure.

In FIG. 3(b), a relationship between $t_1$ and $t_2$ may be represented as:

$$t_1 \text{Boost\_up} = t_2 \text{Boost\_down} \tag{8}$$

then:

$$t_2 = t_1 \frac{\text{Boost\_up}}{\text{Boost\_down}} \tag{9}$$

The following formula can be obtained by substituting formula (9) into formula (7):

$$i_{ripple} \cdot T_s = \frac{1}{2} t_1 \frac{\text{Boost\_up}}{\text{Boost\_down}} \cdot t_1 \cdot \text{Boost\_up} \tag{10}$$

In the boost working stage, an on duty cycle of $S_{16}$ in each switching cycle may be represented as:

$$D_1 = \sqrt{\frac{2 i_{ripple} f_s}{\text{Boost\_up}} \text{Boost\_down}} \tag{11}$$

where $t_1$ is a rising time of the decoupling inductor current, and $t_2$ is a falling time of the decoupling inductor current.

Distribution of duty cycles of switch tubes of a buck-type active power decoupling bridge arm requires an accurate given secondary ripple reference current. With reference to good frequency selection characteristics of an adaptive filter, a form of a transfer function of the adaptive filter is transformed, so that the adaptive filter can become a frequency selector, configured to extract a specific frequency component from a signal. The transfer function thereof is as follows:

$$W(s) = \frac{\xi \cdot (k\omega)s}{s^2 + \xi \cdot (k\omega)s + (k\omega)^2} \tag{12}$$

where $\xi$ is an adaptive filter parameter, k is a constant coefficient, and $\omega$ is a frequency.

A principle of a control method for a high-power density, single-phase cascaded H-bridge rectifier in this embodiment is:

controlling a DC bus voltage of each power conversion unit in a closed-loop manner, to generate an operation voltage of the each power conversion unit and a total voltage of the H-bridge rectifier, where a process of generating the operation voltage of the each power conversion unit and the total voltage of the H-bridge rectifier is:

to achieve stability and balance of a DC-side bus voltage of each cascaded unit, comparing a filtered actual output voltage on the DC side of the each cascaded unit with a voltage reference value, performing PI regulation on each difference value, to obtain a corresponding operation control voltage amplitude, and during system operation, adding up operation control voltages of all units in real time to obtain the total voltage of the H-bridge rectifier;

using the total voltage of the H-bridge rectifier as an outer-loop given value, and controlling a grid-side current in a closed-loop manner, to generate an average modulation signal factor, where a process of generating the average modulation signal factor is:

dividing the total voltage of the H-bridge rectifier by a grid-side per-unit input voltage amplitude, and then multiplying a result by an output phase of a grid-side voltage PLL, to obtain a grid-side current reference voltage; and comparing an actually detected instantaneous grid current value with the grid-side current reference value, and performing static error free tracking of a current by using the grid-side filter inductor, to output the average modulation signal factor;

comparing an average value of the total voltage of the system with each power unit voltage, and then multiplying a per-unit difference value by a grid-side voltage phase to obtain a result as a deviation modulation signal factor, to implement both voltage equalization and suppression of secondary pulsation of the DC bus voltage;

superimposing the deviation modulation signal factor of the each power conversion unit with the average modulation signal factor, to generate a final modulation signal of the each power conversion unit;

comparing the final modulation signal of the each power conversion unit with a carrier, and generating a drive signal of a switch tube of the each power conversion unit by using a single-pole double-frequency phase-shifted carrier modulation algorithm; and extracting a secondary ripple current on the DC bus of the each power conversion unit in real time, and calculating a duty cycle of a power switch tube in the decoupling unit online, to transfer secondary ripple power on the DC bus to the decoupling unit.

Figure 4:
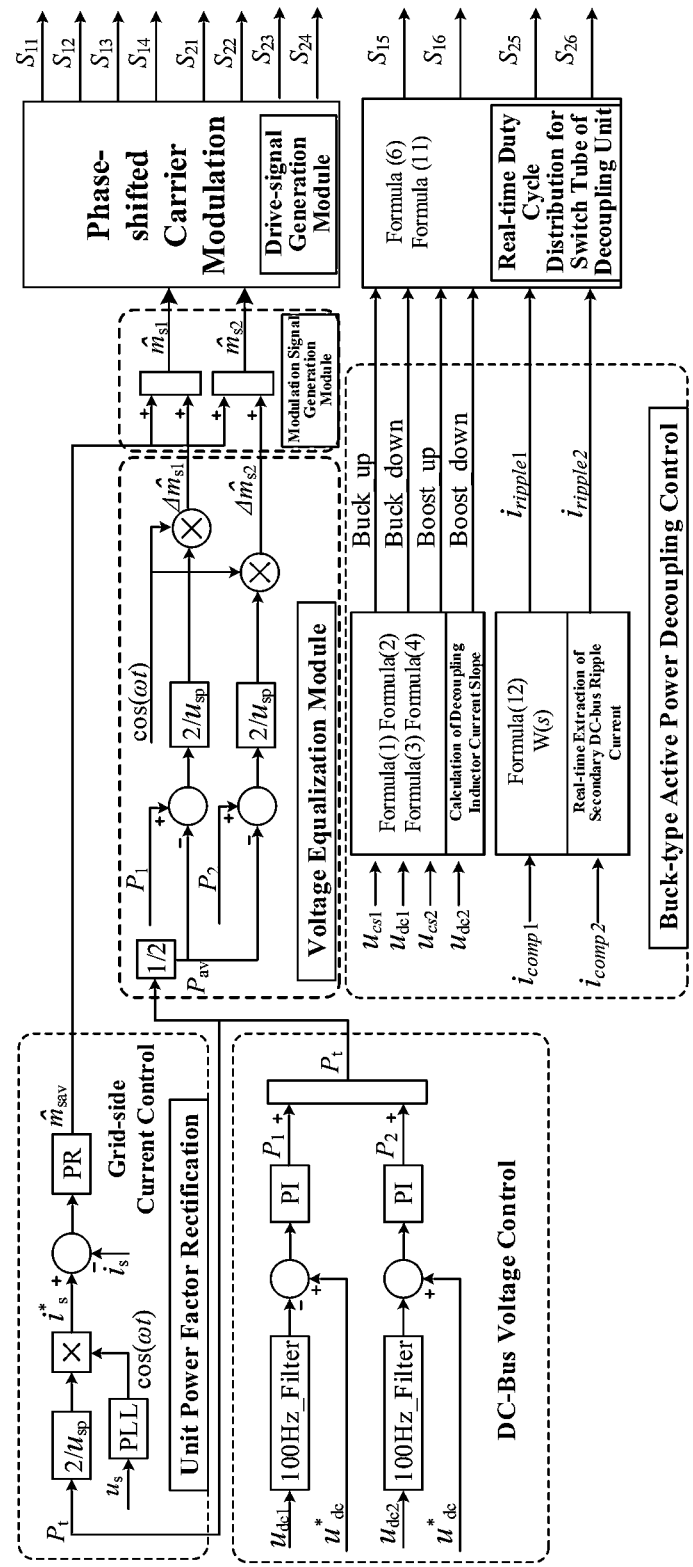
FIG. 4 is a block diagram of a control system of a high-power density, single-phase cascaded H-bridge multilevel converter using two cascaded modules as an example according to an embodiment of the present disclosure.

An independent active-power-decoupling control policy for a single-phase cascaded H-bridge rectifier can implement all of unit power factor rectification, active power decoupling control and DC-side voltage equalization control. The control policy is formed by a unit-power-factor rectification module, a DC bus voltage control module, a voltage equalization module, a modulation-signal generation module, an active power decoupling module, and a drive-signal generation module, and a control block diagram of the control policy is shown in FIG. 4. The unit-power-factor rectification module generates an average modulation signal factor of a system by controlling a grid-side current in a closed-loop manner. The voltage control module generates operating power of each module and a total voltage of the system by controlling a DC bus voltage of a cascaded unit in a closed-loop manner, and provides an outer-loop given value for the unit-power-factor rectification module and the voltage equalization module. The voltage equalization module generates a deviation modulation signal factor of a cascaded unit, and voltage equalization control is a basis of stable operation of the system, and through cooperation with an active-power-decoupling control module, implements both voltage equalization and suppression of secondary pulsation of the DC bus voltage. The modulation-signal generation module generates a final modulation signal by superimposing the deviation modulation signal factor of the cascaded unit on the average modulation signal factor of the system. The drive-signal generation module compares a modulation signal with a carrier to generate, through a single-phase frequency multiplication phase-shifted carrier modulation algorithm, a drive signal of a switch tube.

Figure 10:
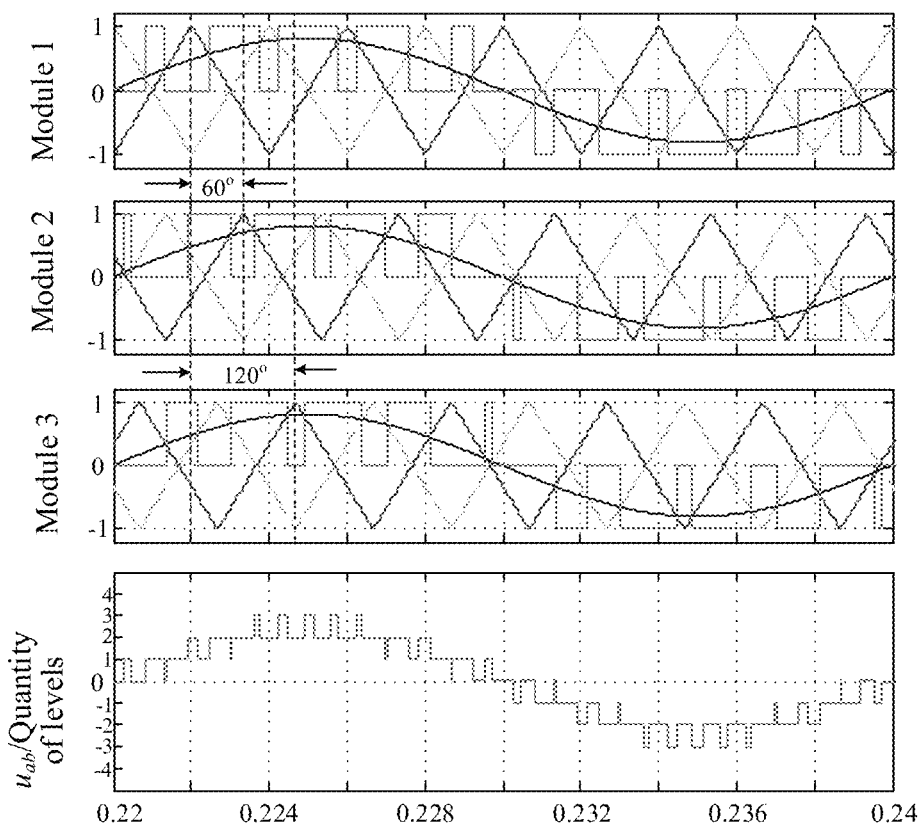
FIG. 10 is a principle diagram of a single-phase frequency multiplication phase-shifted carrier modulation algorithm according to an embodiment of the present disclosure.

A working principle of the single-phase frequency multiplication phase-shifted carrier modulation algorithm is shown in FIG. 10, and double-frequency phase-shifted carrier modulation of a three-unit cascaded H-bridge rectifier is used as an example. The three cascaded units share one modulation wave, and carriers of the three units sequentially lag by 60°. For example, N units sequentially lag by 180°/N (N is a quantity of the cascaded units). Carriers used by two bridge arms on the left and right of the same unit have a difference of 180° (or reversed phases). In this way, if a device switching frequency is $f_s$, an equivalent frequency of a grid-side filter is $2*N*f_s$, thereby helping reduce a reactor, and improving quality of a grid-connected current.

Upon the foregoing control, unit power factor rectification, DC-side output voltage equalization control, and active power decoupling can be implemented.

A simulation experiment in MATLAB/Simulink is performed to verify validity of the mentioned topology and control solution. Simulation parameters are shown in Table 1.

TABLE 1

| Simulation parameter | Value |
| --- | --- |
| Effective value $u_s$ of a grid voltage | 400 V |
| Grid frequency f | 50 Hz |
| Grid-connected inductor $L_S$ | 12 mH |
| Quantity of cascaded units | 2 |
| DC-side support capacitors $C_1$ and $C_2$ | 100 uF |
| Decoupling capacitors $C_{S1}$ and $C_{S2}$ | 150 uF |
| Decoupling inductors $L_{r1}$ and $L_{r2}$ | 200 uH |
| DC-side output voltages $U_{dc1}$ and $U_{dc2}$ | 800 V |
| Total output power | 8 kW |
| Switching frequency $f_s$ of a rectifier unit | 10 kHz |
| Switching frequency $f_s$ of a decoupling unit | 20 kHz |

Figure 5A:
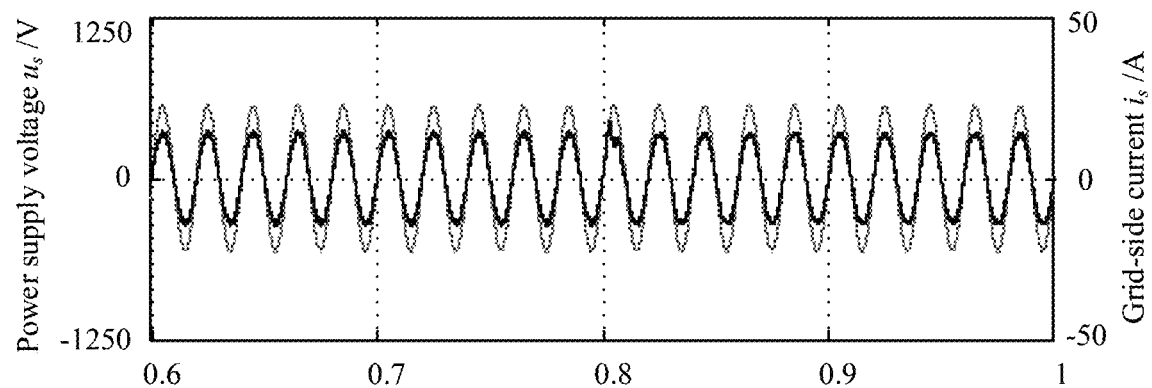
FIG. 5(*a*) is a waveform diagram of a grid-side voltage and a grid-side current according to an embodiment of the present disclosure.
Figure 5B:
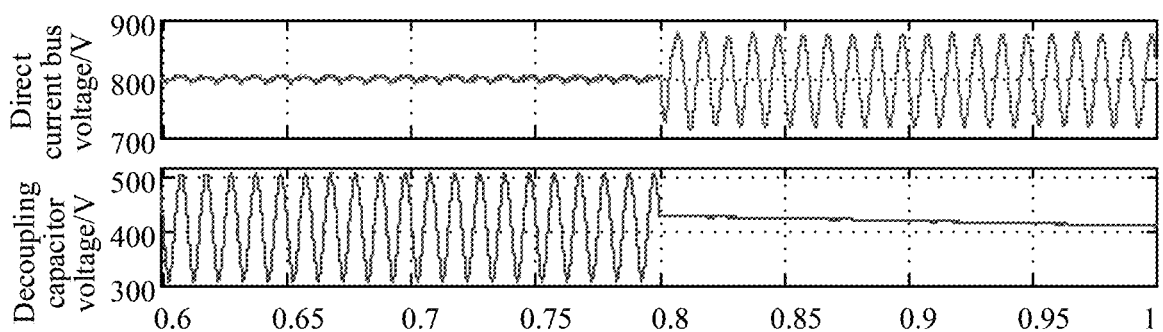

FIG. 5(a) and FIG. 5(b) are simulation analysis diagrams of active power decoupling of a single-phase two-module cascaded H-bridge rectifier, where FIG. 5(a) shows waveforms of a grid-side voltage and a grid-side current, and FIG. 5(b) shows waveforms of a DC-side output voltage and a decoupling capacitor voltage. A decoupling circuit is in a working state before 0.8 seconds, and the decoupling circuit is off after 0.8 seconds. During decoupling, a fluctuation range of a DC-side voltage is from 792 V to 806 V, and is about ±1% of a given value of the DC-side bus voltage, and an AC input current THD=3.64%. After the decoupling circuit is cut off, a range of the DC bus ripple voltage is broadened to 719 V to 878 V, and the AC input current THD=4.85%. To keep a fluctuation range of the ripple voltage at ±1%, a capacitance value of the DC bus support capacitor needs to be 1000 uF. The mentioned topology and control solution greatly suppress the secondary ripple power and reduce a capacitance value of the DC bus support capacitor.

Figure 6:
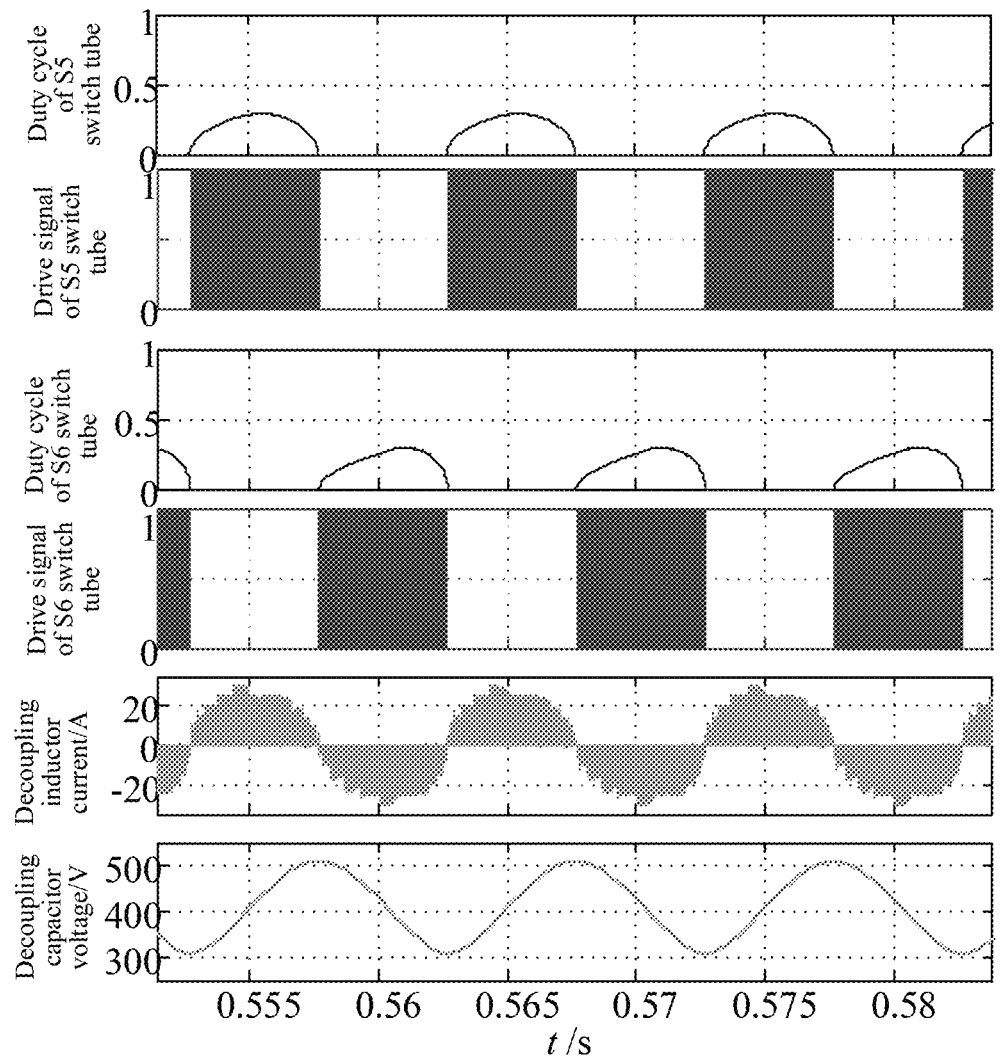
FIG. 6 is a relevant waveform diagram of buck-type active power decoupling according to an embodiment of the present disclosure.

FIG. 6 is a waveform diagram of relevant parameters of a working process of a buck-type active power decoupling circuit, and shows a process of ripple power decoupling of the decoupling circuit more intuitively.

Figure 7A:
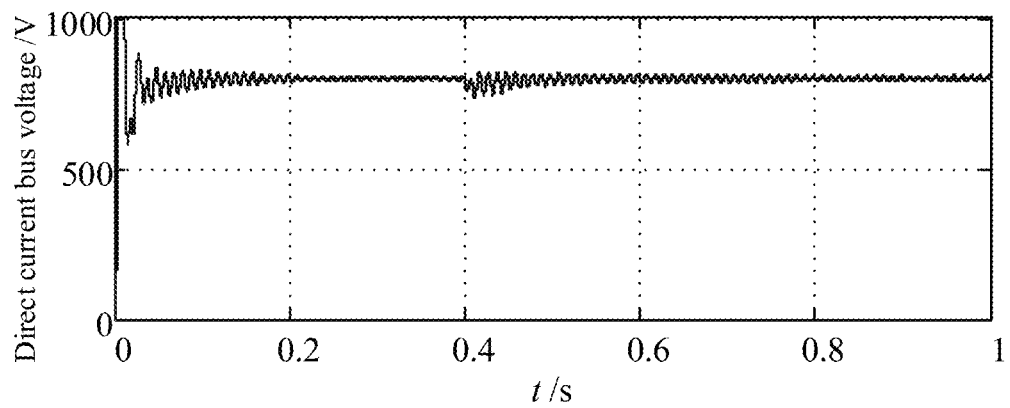
FIG. 7(*a*) is a waveform diagram of DC-side output voltages of two modules before and after a sudden load change according to an embodiment of the present disclosure.
Figure 7B:
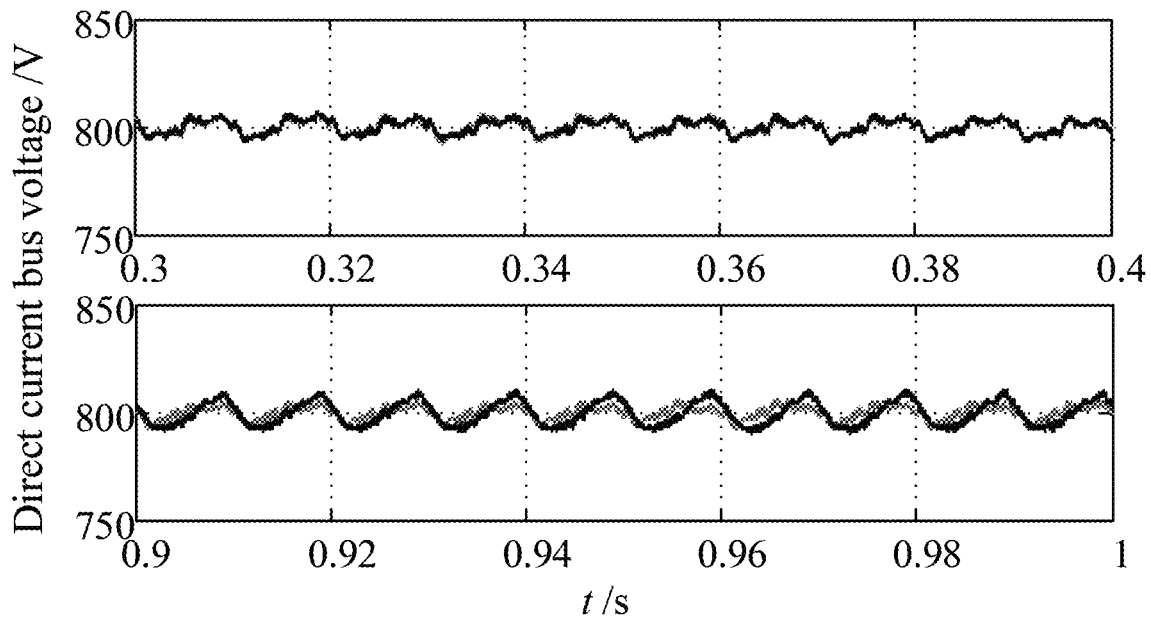

FIG. 7(a) and FIG. 7(b) show simulation waveforms during a sudden load change when a system is started in a case that the DC-side load is in a balanced state. At 0.4 seconds, a load resistance R1 suddenly changes to 80Ω, and a load resistance R2 suddenly changes to 300Ω. FIG. 7(a) shows a waveform of a two-module DC-side output voltage in a simulation process. FIG. 7(b) shows waveforms of the two-module DC-side output voltage respectively after DC-side load equalization and after a sudden load change. Before the sudden load change, a fluctuation range of two-module DC-side voltage is 800±6 V, and a voltage fluctuation suppression effect is good. After the sudden load change, a fluctuation range of $u_{dc1}$ voltage is ±6 V, and a fluctuation range of $u_{dc2}$ voltage is ±9 V. It indicates that after the sudden load change, under the comprehensive control of voltage equalization control and active power decoupling, low voltage pulsation and voltage-equalized output can be implemented.

Figure 8:
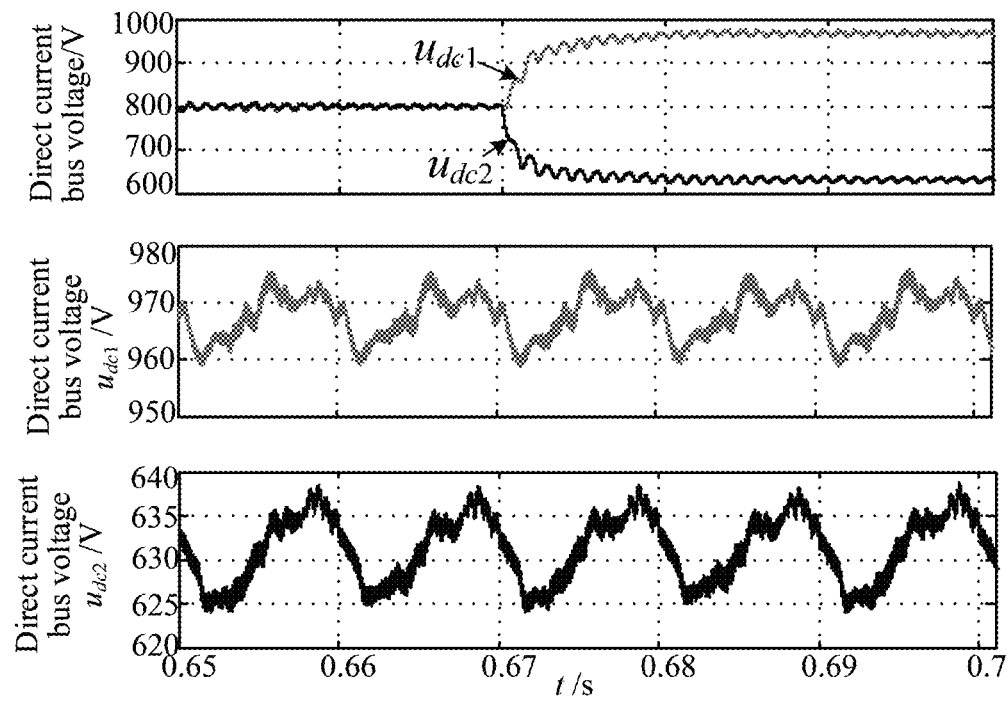
FIG. 8 is a waveform diagram of a DC-side output voltage when voltage equalization control is cut off after a sudden system change according to an embodiment of the present disclosure.

FIG. 8 shows waveforms of the DC-side output voltage when there is no voltage equalization control after the sudden load change. The simulation effect shows that the power decoupling can still be implemented when there is no voltage equalization control on a cascaded module, indicating independence and effectiveness of the adopted active power decoupling control policy based on secondary ripple current extraction for real-time duty cycle distribution. However, certainly, a voltage stress of a DC-side support capacitor is increased if a voltage equalization control policy is not added, and a peak value of an inductor current and a fluctuation range of a capacitor of the decoupling unit also change, which is not beneficial to stable operation of the system.

Figure 9A:
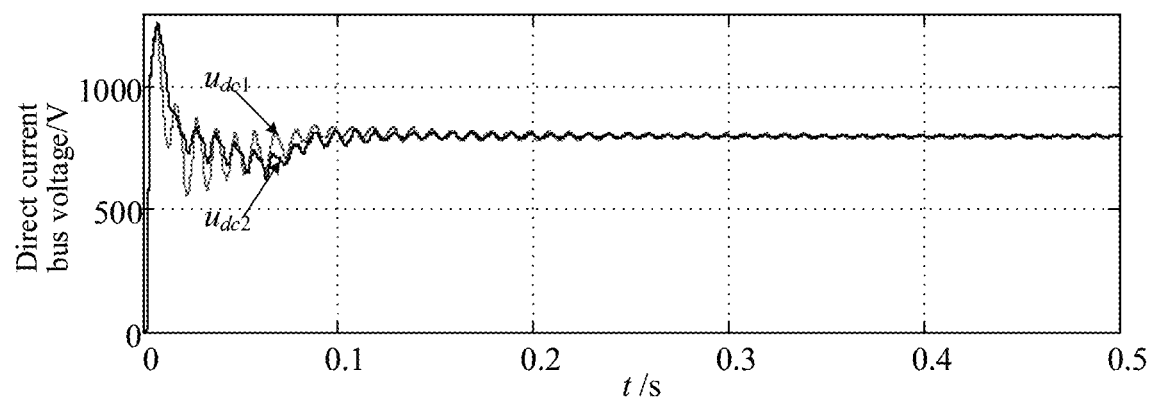
FIG. 9(*a*) is a waveform diagram of a DC-side output voltage during starting in an unbalanced state according to an embodiment of the present disclosure.
Figure 9B:
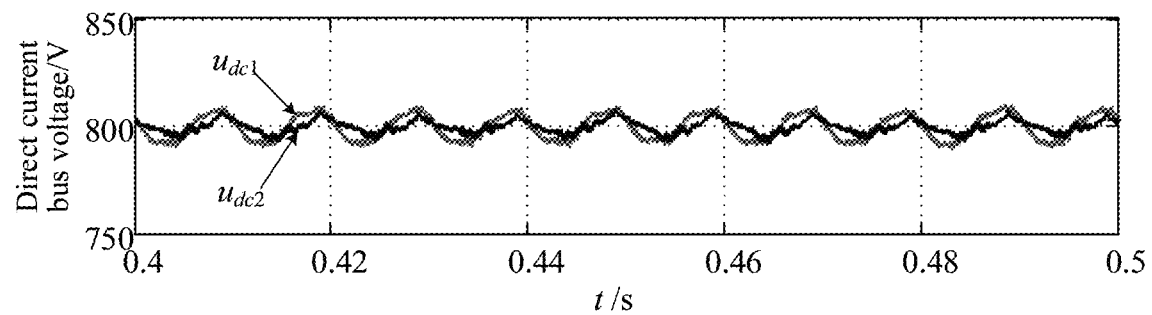

FIG. 9(a) and FIG. 9(b) show simulation analysis of active power decoupling when a system is started in an unbalanced load state. FIG. 9(a) shows a waveform of a DC-side output voltage during starting in an unbalanced load state, and FIG. 9(b) shows an enlarged waveform from 0.4 seconds to 0.5 seconds. It can be learned from the figures that, an effect of ripple voltage suppression is good, and the system can implement both suppression of DC-side ripple voltage pulsation and voltage equalization control of each cascaded unit through comprehensive control policy for voltage equalization and active power decoupling, so that safe, reliable, high-power density, and stable operation of the system can be implemented.

A result of the foregoing simulation experiment shows that, in the embodiments, the single-phase H-bridge rectifier having independent active power decoupling and a control policy thereof better implement an active power decoupling function while ensuring a unit power factor of a system and the DC bus voltage balance, thereby effectively suppressing DC-side ripple power, reducing a capacitance value of the DC-side support capacitor, and improving system reliability and power density of the system.

The foregoing descriptions are merely preferred embodiments of the present disclosure, but are not intended to limit the present disclosure. A person skilled in the art may make various alterations and variations to the present disclosure. Any modification, equivalent replacement, or improvement made within the spirit and principle of the present disclosure shall fall within the protection scope of the present disclosure.

What is claimed is:

1. A control method for a high-power density, single-phase cascaded H-bridge rectifier, the high-power density, single-phase cascaded H-bridge rectifier comprising: an alternating current (AC) grid-side filter inductor and at least two cascaded power conversion units, wherein each power conversion unit comprises an H-bridge power unit, a decoupling unit, and a direct current (DC)-side equivalent load that are connected in parallel; and each decoupling unit is an independent buck-type active power decoupling circuit, and the decoupling unit is configured to buffer secondary ripple power, to reduce a capacity of a DC bus capacitor, wherein the control method comprises:

controlling a DC bus voltage of each power conversion unit in a closed-loop manner, to generate an operation voltage of the each power conversion unit and a total voltage of the H-bridge rectifier;

using the total voltage of the H-bridge rectifier as an outer-loop given value, and controlling a grid-side current in a closed-loop manner, to generate an average modulation signal factor;

comparing an average value of the total voltage of the H-bridge rectifier with each power unit voltage, and then multiplying a per-unit difference value by a grid-side voltage phase to obtain a result as a deviation modulation signal factor, to implement both voltage equalization and suppression of secondary pulsation of the DC bus voltage;

superimposing the deviation modulation signal factor of the each power conversion unit with the average modulation signal factor, to generate a final modulation signal of the each power conversion unit;

comparing the final modulation signal of the each power conversion unit with a carrier, and generating a drive signal of a switch tube of the each power conversion unit by using a single-pole double-frequency phase-shifted carrier modulation algorithm; and extracting a secondary ripple current on the DC bus of the each power conversion unit in real time, and calculating a duty cycle of a power switch tube in the decoupling unit online, to transfer secondary ripple power on the DC bus to the decoupling unit.

2. The control method for the high-power density, single-phase cascaded H-bridge rectifier according to claim 1, wherein the decoupling unit comprises a series-connected power module, the series-connected power module is formed by two switch power elements connected in series, two ends of the series-connected power module are respectively connected to a positive bus and a negative bus on a DC side of the corresponding power conversion unit, an intermediate connection point of the series-connected power module is connected to a circuit in which an inductor and a capacitor are connected in series, and the other end of the capacitor is connected to the negative bus on the DC side of the corresponding power conversion unit.

3. The control method for the high-power density, single-phase cascaded H-bridge rectifier according to claim 1, wherein the each power conversion unit further comprises: a DC filter capacitor connected to the DC-side equivalent load in parallel, wherein the DC filter capacitor is configured to eliminate a high-order harmonic wave.

4. The control method for the high-power density, single-phase cascaded H-bridge rectifier according to claim 1, wherein the DC-side equivalent load is a resistor element, a DC/DC converter, or a capacitor element.

5. The control method for the high-power density, single-phase cascaded H-bridge rectifier according to claim 1, wherein a process of generating the operation voltage of the each power conversion unit and the total voltage of the H-bridge rectifier is:

to achieve stability and balance of a DC-side bus voltage of each cascaded unit, comparing a filtered actual output voltage on the DC side of the each cascaded unit with a voltage reference value, performing PI regulation on each difference value, to obtain a corresponding operation control voltage amplitude, and during system operation, adding up operation control voltages of all units in real time to obtain the total voltage of the H-bridge rectifier.

6. The control method for the high-power density, single-phase cascaded H-bridge rectifier according to claim 1, wherein a process of generating the average modulation signal factor is:

dividing the total voltage of the H-bridge rectifier by a grid-side per-unit input voltage amplitude, and then multiplying a result by an output phase of a grid-side voltage phase-locked loop (PLL), to obtain a grid-side current reference voltage; and comparing an actually detected instantaneous grid current value with the grid-side current reference value, and performing static error free tracking of a current by using the grid-side filter inductor, to output the average modulation signal factor.

7. A control system of a high-power density, single-phase cascaded H-bridge rectifier, the high-power density, single-phase cascaded H-bridge rectifier comprising: an alternating current (AC) grid-side filter inductor and at least two cascaded power conversion units, wherein each power conversion unit comprises an H-bridge power unit, a decoupling unit, and a direct current (DC)-side equivalent load that are connected in parallel; and each decoupling unit is an independent buck-type active power decoupling circuit, and the decoupling unit is configured to buffer secondary ripple power, to reduce a capacity of a DC bus capacitor, wherein the control system comprises:

a DC bus voltage control module, configured to control a DC bus voltage of each power conversion unit in a closed-loop manner, to generate an operation voltage of the each power conversion unit and a total voltage of the H-bridge rectifier;

a unit-power-factor rectification module, configured to use the total voltage of the H-bridge rectifier as an outer-loop given value, and control a grid-side current in a closed-loop manner, to generate an average modulation signal factor;

a voltage equalization module, configured to respectively compare an average value of the total voltage of the system with each power unit voltage, and then multiply a per-unit difference value by a grid-side voltage phase to obtain a result as a deviation modulation signal factor, to implement both voltage equalization and suppression of secondary pulsation of the DC bus voltage;

a modulation-signal generation module, configured to superimpose the deviation modulation signal factor of the each power conversion unit with the average modulation signal factor, to generate a final modulation signal of the each power conversion unit;

a drive-signal generation module, configured to compare the final modulation signal of the each power conversion unit with a carrier, and generate a drive signal of a switch tube of the each power conversion unit by using a single-pole double-frequency phase-shifted carrier modulation algorithm; and an active-power-decoupling control module, configured to extract a secondary ripple current on the DC bus of the each power conversion unit in real time, and calculate a duty cycle of a power switch tube in the decoupling unit online, to transfer secondary ripple power on the DC bus to the decoupling unit.

8. The control system of the high-power density, single-phase cascaded H-bridge rectifier according to claim 7, wherein in the DC bus voltage control module, a process of generating the operation voltage of the each power conversion unit and the total voltage of the H-bridge rectifier is:

to achieve stability and balance of a DC-side bus voltage of each cascaded unit, comparing a filtered actual output voltage on the DC side of the each cascaded unit with a voltage reference value, performing PI regulation on each difference value, to obtain a corresponding operation control voltage amplitude, and during system operation, adding up operation control voltages of all units in real time to obtain the total voltage of the H-bridge rectifier.

9. The control system of the high-power density, single-phase cascaded H-bridge rectifier according to claim 7, wherein in the unit-power-factor rectification module, a process of generating the average modulation signal factor is:

dividing the total voltage of the H-bridge rectifier by a grid-side per-unit input voltage amplitude, and then multiplying a result by an output phase of a grid-side voltage phase-locked loop (PLL), to obtain a grid-side current reference voltage; and comparing an actually detected instantaneous grid current value with the grid-side current reference value, and performing static error free tracking of a current by using the grid-side filter inductor, to output the average modulation signal factor.

* * * * *